United States Patent [19]

Morino

[11] 4,436,418

[45] Mar. 13, 1984

[54] DISTANCE DETECTOR DEVICE

[75] Inventor: Yukio Morino, Shikawatashi, Japan

[73] Assignee: Seiko Koki Kabushiki Kaisha, Tokyo, Japan

[21] Appl. No.: 299,528

[22] Filed: Sep. 4, 1981

[30] Foreign Application Priority Data

Sep. 8, 1980 [JP] Japan ............................... 55-124268

[51] Int. Cl.³ ........................... G01C 3/10; G03B 7/08
[52] U.S. Cl. ........................................ 356/1; 354/403
[58] Field of Search ................ 356/1; 354/25 R, 25 A

[56] References Cited

U.S. PATENT DOCUMENTS

| | | | |
|---|---|---|---|
| 2,468,042 | 4/1949 | Cranberg | 356/1 |
| 3,224,319 | 12/1965 | Robert et al. | 356/1 |
| 3,938,893 | 2/1976 | Nanba et al. | 354/25 |
| 4,304,487 | 12/1981 | Odone et al. | 356/1 |

Primary Examiner—S. C. Buczinski
Attorney, Agent, or Firm—Robert E. Burns; Emmanuel J. Lobato; Bruce L. Adams

[57] ABSTRACT

Light projected from active lighting means or light projecting means toward an object is reflected by said object and a light spot is produced on a light sensitive element by the reflected light. A distance to said object is determined by sensing a position of said light spot. When a shade detector scanning the surface of the light sensitive element shields the light spot generated by the light reflected from the object, a photoelectric output from said light sensitive element is varied. Correspondence between the position of said shade detector when said photoelectric output is varied and a distance to said object enables a measurement of the distance to said object.

7 Claims, 3 Drawing Figures

DISTANCE DETECTOR DEVICE

BACKGROUND OF THE INVENTION

This invention relates to a distance detector device utilizing the active lighting method with the principle of triangulation in which a variation of the photoelectric output of the light sensitive element is detected to measure a distance between the distance detector device camera and the object.

In a conventional system, there has been proposed a distance detector device having light projecting means or active lighting means, and a plurality of light sensitive elements each corresponding to a different object distance. In operation, light is projected from the light projecting means to the object, and the distance from the object to the distance detector device is measured by sensing the light sensitive element receiving the highest intensity reflected light from the object.

However, the sensor circuit applied in this system requires a quite complex circuit, and use of a plurality of light sensitive elements requires an increased photoelectric output of each of the light sensitive elements, so that the scale of the circuit for use in comparing the photoelectric outputs with each other or obtaining their maximum valve is substantial.

In turn, there has been also proposed a device for detecting a distance by a method wherein a photoelectric output from a light sensitive element such as a light potentiometer is varied in response to which position a light reflected from the object is incident on said light potentiometer, and thereby detected. However, in this device, a uniform surface resistance of the light sensitive element forming a light potentiometer becomes very important and a method for making the light sensitive element is also specialized, resulting in the element being expensive to manufacture. Further, there has also been found such the disadvantage that a circuit for measuring a distance between the distance detecting device and the object and for generating a linearity of the output signal is complex.

In view of the problems described above, the present invention has been devised.

SUMMARY OF THE INVENTION

The device of the present invention is constructed such that light is projected or emitted toward the object and the reflected light is received by a standard light sensitive element such as, for example, a silicon photodiode, and a distance between the device and the object is measured by a method wherein a light-blocking shade is operatively arranged on a plane of light incidence on said light sensitive element, and said shade is operated across the line of sight to the object and thereby the photoelectric output from said light sensitive element is varied when the light reflected from the object is shielded by said shade. Therefore, it is not necessary to apply a plurality of light sensitive elements, resulting in a quite simple circuit arrangement. The light sensitive element is not a special component, so that the distance detector may be made less expensive. The present invention has its object to provide a novel distance detector device having no disadvantages as found in a conventional distance detector device.

DETAILED DESCRIPTION OF THE INVENTION

Figure 1:
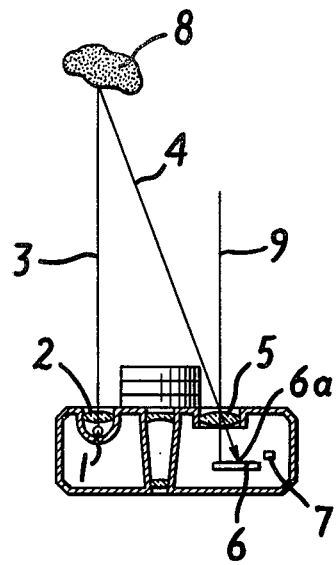
FIG. 1 illustrates a preferred embodiment of the distance detector device of the present invention applied to a still camera.

Referring now to the drawings, one preferred embodiment of the present invention will be described as applied to a still camera.

In the drawing, 1 is a light emitting element such as a lamp or LED, 2 is a light projecting lens for making a beam of the emitted light, 3 is an optical axis of the emitted or projected light, 4 is an optical axis of the reflected light, 5 is a light sensitive lens, 6 is a light sensitive element, 6a is a light spot generated on said light sensitive element by reflected light reflected back from the object 8 along the optical axis 4, 7 is a shade light-blocking member in the form of a movable, 8 is an object, and 9 is an optical axis of the light sensitive lens 5. The operational amplifier 10 and feedback resistor R together comprise an amplifier circuit which amplifiers a photoelectric output of the light sensitive element 6. $V_0$ indicates an output voltage of the operational amplifier 10 and comprises an output distance signal wherein the drop in value of the signal corresponds to the distance to the object as explained hereafter.

Figure 2:
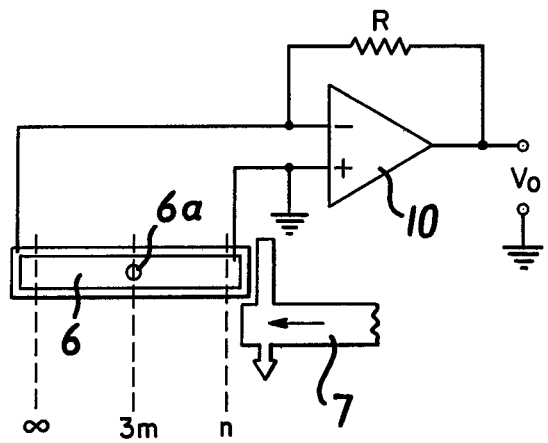
FIG. 2 is a schematic diagram of the circuit of the distance detector device of the present invention.

The distance detector device of the present invention is made, as shown in FIG. 1, such that the shade 7 is arranged between the light sensitive lens 5 and the light sensitive element 6. The light-blocking member or shade shade 7 is moved over the light responsive surface of the light sensitive element 6 in a direction indicated by the arrow in FIGS. 2 and 3. In FIG. 2, the output terminals of the light sensitive element 6 are respectively connected to the inverting and the non-inverting input terminals of the operational amplifier 10, respectively, and the shortcut current in said light sensitive element 6 is amplified and the output $V_0$ may be obtained as a voltage.

In FIG. 1, the light from the light emitting element 1 is concentrated into a beam form by the light projecting lens 2 along the optical axis 3 and strikes the object 8. Light reflected at the surface of the object 8 back along the optical axis 4 is concentrated by the light sensitive lens 5 to produce a light spot 6a on the light sensitive element 6. In place of the light sensitive lens 5, another kind of image forming means may be used.

The light spot 6a may be produced at a different position on the light sensitive element 6 depending upon the distance between the camera and the object 8. When it is assumed that the object is located at a far limitless position (i.e., infinity), the reflected light would be received at an angle coinciding with the optical axis 9 of the light sensitive lens 5, resulting in producing a light spot at a point crossing with the optical axis 9 on the light sensitive element 6. Similarly, as the object approaches the lens, the position where the light spot is produced is slightly displaced in a rightward direction on the light sensitive element 6 shown in FIG. 1.

Figure 3:
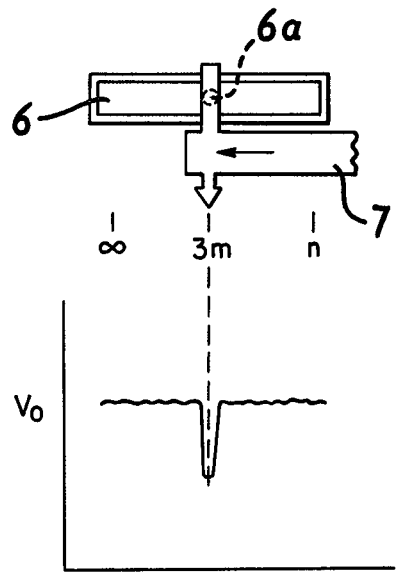
FIG. 3 illustrates the operation of the present invention.

To determine the distance of the object 8, the position of said light spot is sensed by a method described below in reference to the output from a sensor circuit connected to and coacting with the moving shade 7 and the light sensitive element 6, and thereby the distance between the object and the camera is detected. When the shade 7 is placed at a position shown in FIG. 2, the light sensitive element 6 receives the light produced at the light spot 6a and natural light other than that produced by the light emitting element 1. At this time, the output of the circuit $V_0$ is a voltage proportional or corresponding to a sum of all the light received by the light sensitive element 6. Further, when it is assumed that the shade 7 is moved in a direction indicated by an arrow up to a position where it covers or overlaps the light spot 6a, as shown in FIG. 3, the output $V_0$ will be decreased in such a way as shown in FIG. 3 illustrating the output of the circuit. This is due to the fact that the light spot is shielded by the light-blocking shade and the photoelectric output is decreased by a value corresponding to the shielded light. When it is further assumed that the shade 7 is moved more and the light spot is again incident on the light sensitive element 6, the output of the circuit $V_0$ is also returned to its original level. By such a construction, the light-blocking shade 7 successively covers equal-area portions of the surface of the light sensitive element 6 as the shade is moved along the length of the light sensitive element. In this way, movement of the shade 7 shows that the lowest value of the output of the circuit corresponds to a position where the light spot 6a is produced and represents the distance to the object 8 and as shown, for example, in FIGS. 2 and 3, the position of the shade 7 (corresponding to an object distance of 3 m in case of the example shown in FIG. 3) indicates the distance between the object 8 and the camera.

The light emitting element 1 may be an incandescent lamp etc. or an infrared light emitting diode having superior efficiency. In the preferred embodiment shown, the shade 7 has been described for the sake of clarity or convenience of illustration such that it is moved linearly or in a straight line, but it is also possible that said shade may be composed of a rotary member.

As described above, the distance detector device of the present invention in which the distance between the object and the camera is detected by receiving the reflected light of the projection is made such that it includes a piece of light sensitive element, said light sensitive element does not require any special quality, but the sensing operation may be performed by an element such as a standard photodiode. Therefore, a quite simple circuit arrangement may be produced with less expenditure. Further, provision of a scanning movable mirror will not cause any difficult or troublesome adjustment for the distance to be determined, and further the present invention may be applied as a distance detector device used not only in a still camera but also in various other applications.

What is claimed is:

1. A distance detector device comprising: light projecting means for projecting light toward an object whose distance is to be measured, said light projecting means comprising a light emitting element and a light projecting lens for projecting light from said light emitting element; image forming means for receiving reflected light from the object whose distance is to be measured and for forming an image thereof; a light sensitive element positioned at an image forming part of said image forming means for developing a photoelectric output in response to light incident thereon; a light-blocking shade movable over a surface of said light sensitive element to vary its position along the length of said light sensitive element and accordingly vary the photoelectric output thereof in dependence upon the distance to the object whose distance is to be measured; and a sensor circuit for sensing a variation of the photoelectric output of said light sensitive element caused by shielding of the light reflected from the object whose distance is to be measured when said shade is operated.

2. A distance detector device as set forth in claim 1, further comprising indicating means cooperative with said shade for indicating the distance to the object whose distance is to be measured.

3. A distance detector for measuring thhe distance to an object, comprising:
   light emitting means for emitting light in a predetermined direction towards an object whose distance is to be measured;
   light sensing means comprising a light sensing element having a light responsive surface for developing an electrical output signal proportional to light incident on said light responsive surface;
   focusing means for focusing light including light emitted by the light emitting means and reflected by the object onto said light responsive surface;
   light-blocking means for successively covering successive equal-area portions of said light responsive surface to successively block light focused on said light responsive surface by said focusing means and cause a change in the output signal of said light sensing means corresponding to the intensity of the blocked light; and
   circuit means coacting with the light sensing means and the light-blocking means for producing an output distance signal representative of the distance to the object.

4. A distance detector according to claim 3, wherein said light emitting means is comprised of a light emitting element for emitting light and a lens oriented to focus the emitted light in a predetermined direction.

5. A distance detector according to claim 3, wherein said light sensing element is a photoelectric element, and said light sensing means is comprised of said photoelectric element and an amplifier circuit connected for amplifying the output signal of said photoelectric element and for developing the amplified signal as the light sensing means output signal.

6. A distance detector according to claim 3, wherein said light-blocking means for progressively covering successive equal-area portions of said light responsive surface is comprised of a light-blocking shade movable across said light responsive surface.

7. A distance detector according to claim 3; further including distance indicating means coacting with the light-blocking means for indicating the distance to the object.

* * * * *